(12) United States Patent
Chellappan

(10) Patent No.: US 12,535,226 B2
(45) Date of Patent: Jan. 27, 2026

(54) OVER THE RANGE MICROWAVE OVEN WITH IMPROVED HOOD VENTILATION

(71) Applicant: Haier US Appliance Solutions, Inc., Wilmington, DE (US)

(72) Inventor: Bagawathkumar Chellappan, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 355 days.

(21) Appl. No.: 18/330,413

(22) Filed: Jun. 7, 2023

(65) Prior Publication Data
US 2024/0410593 A1   Dec. 12, 2024

(51) Int. Cl.
*F24C 15/20* (2006.01)
*F24C 15/32* (2006.01)
*H05B 6/64* (2006.01)

(52) U.S. Cl.
CPC ........ *F24C 15/2042* (2013.01); *F24C 15/322* (2013.01); *H05B 6/6426* (2013.01)

(58) Field of Classification Search
CPC .............. F24C 15/2078; F24C 15/2085; F24C 15/2092; F24C 15/20; F24C 15/2042
USPC ............... 454/63–65, 49, 67, 56; 126/299 D, 126/299 R, 29 F
See application file for complete search history.

(56) References Cited

U.S. PATENT DOCUMENTS

| | | | |
|---|---|---|---|
| 693,838 A * | 2/1902 | Canedy | B08B 15/002 454/63 |
| 6,162,286 A * | 12/2000 | Hasama | B01D 46/20 96/288 |
| 6,242,725 B1 | 6/2001 | Murata et al. | |
| 7,193,195 B2 | 3/2007 | Lundstrom | |
| 2009/0137201 A1* | 5/2009 | Huber | F24C 15/2092 126/299 D |
| 2024/0392974 A1* | 11/2024 | Heimerdinger | H05B 6/642 |

FOREIGN PATENT DOCUMENTS

| | | | | |
|---|---|---|---|---|
| CN | 206656405 U | 11/2017 | | |
| CN | 215295058 U | 12/2021 | | |
| CN | 113108345 B | 5/2022 | | |
| EP | 1418386 B1 | 9/2006 | | |
| KR | 200213186 Y1 | 2/2001 | | |
| KR | 100551488 B1 | 2/2006 | | |
| KR | 20100009886 A * | 1/2010 | .......... | F24C 15/2092 |
| KR | 101450558 B1 | 10/2014 | | |
| WO | WO2021020729 A1 | 2/2021 | | |

* cited by examiner

*Primary Examiner* — Vivek K Shirsat
(74) *Attorney, Agent, or Firm* — Dority & Manning, P.A.

(57) ABSTRACT

An over the range microwave appliance includes a cabinet defining a cooking chamber, the cabinet comprising a sidewall that defines a fan inlet. A duct assembly is removably attached to the cabinet and includes a fixed outer duct that is mounted to the sidewall and an extendable duct positioned within the fixed outer duct and being movable between an extended position and a retracted position, the extendable duct defining an intake aperture proximate a bottom end of the extendable duct and a discharge aperture proximate a top end of the extendable duct.

20 Claims, 7 Drawing Sheets

OVER THE RANGE MICROWAVE OVEN WITH IMPROVED HOOD VENTILATION

FIELD OF THE INVENTION

The present disclosure relates generally to over-the-range kitchen appliances with a ventilation system. In particular, the disclosure relates to over the range microwave ovens with a ventilation system.

BACKGROUND OF THE INVENTION

Built-in kitchen appliances, for example microwave ovens, have become commonplace in household kitchens. In many applications, a microwave is built-in over a cooktop or range. Microwaves configured in this arrangement are generally referred to as over-the-range (OTR) appliances. In many cases, OTR microwave ovens include a ventilation system to capture and redirect steam, smoke, airborne grease, or odors generated at the range. Typical ventilation systems include an air intake opening located along a bottom surface of the OTR microwave. The ventilation system creates an air flow through a filter, into the intake opening, and either reintroduces the air into the room or directs it to an exhaust exit to the external atmosphere.

Many conventional OTR microwave ovens with ventilation have intake openings that are inwardly spaced from the perimeter of the microwave oven. In addition, conventional OTR microwave ovens have a smaller footprint relative to oversized cooktops. For example, common OTR microwaves are 30 inches wide, while cooktops are commonly 36 inches wide or wider. Accordingly, conventional OTR microwave ovens fail to sufficiently capture the steam, smoke, and odors produced at the cooktop. For example, if fumes are being generated at the outer burners of a cooktop, the intake vents of a smaller OTR microwave may fail to capture such fumes, leading to hazardous conditions, consumer dissatisfaction, etc.

Accordingly, an OTR microwave with increased ventilation coverage may be beneficial.

BRIEF DESCRIPTION OF THE INVENTION

Aspects and advantages of the invention will be set forth in part in the following description, or may be apparent from the description, or may be learned through practice of the invention.

In one exemplary embodiment, an over the range microwave appliance defining a vertical direction, a lateral direction, and a transverse direction is provided. The over the range microwave appliance includes a cabinet defining a cooking chamber, the cabinet comprising a sidewall that defines a fan inlet and a duct assembly removably attached to the cabinet. The duct assembly includes a fixed outer duct that is mounted to the sidewall of the cabinet and an extendable duct positioned within the fixed outer duct and being movable between an extended position and a retracted position, the extendable duct defining an intake aperture proximate a bottom end of the extendable duct and a discharge aperture proximate a top end of the extendable duct.

In another exemplary embodiment, a duct assembly for an over the range microwave appliance is provided. The over the range microwave appliance includes a cabinet defining a cooking chamber, the cabinet comprising a sidewall that defines a fan inlet. The duct assembly includes a fixed outer duct that is removably mounted to the sidewall of the cabinet and an extendable duct positioned within the fixed outer duct and being movable between an extended position and a retracted position, the extendable duct defining an intake aperture proximate a bottom end of the extendable duct and a discharge aperture proximate a top end of the extendable duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
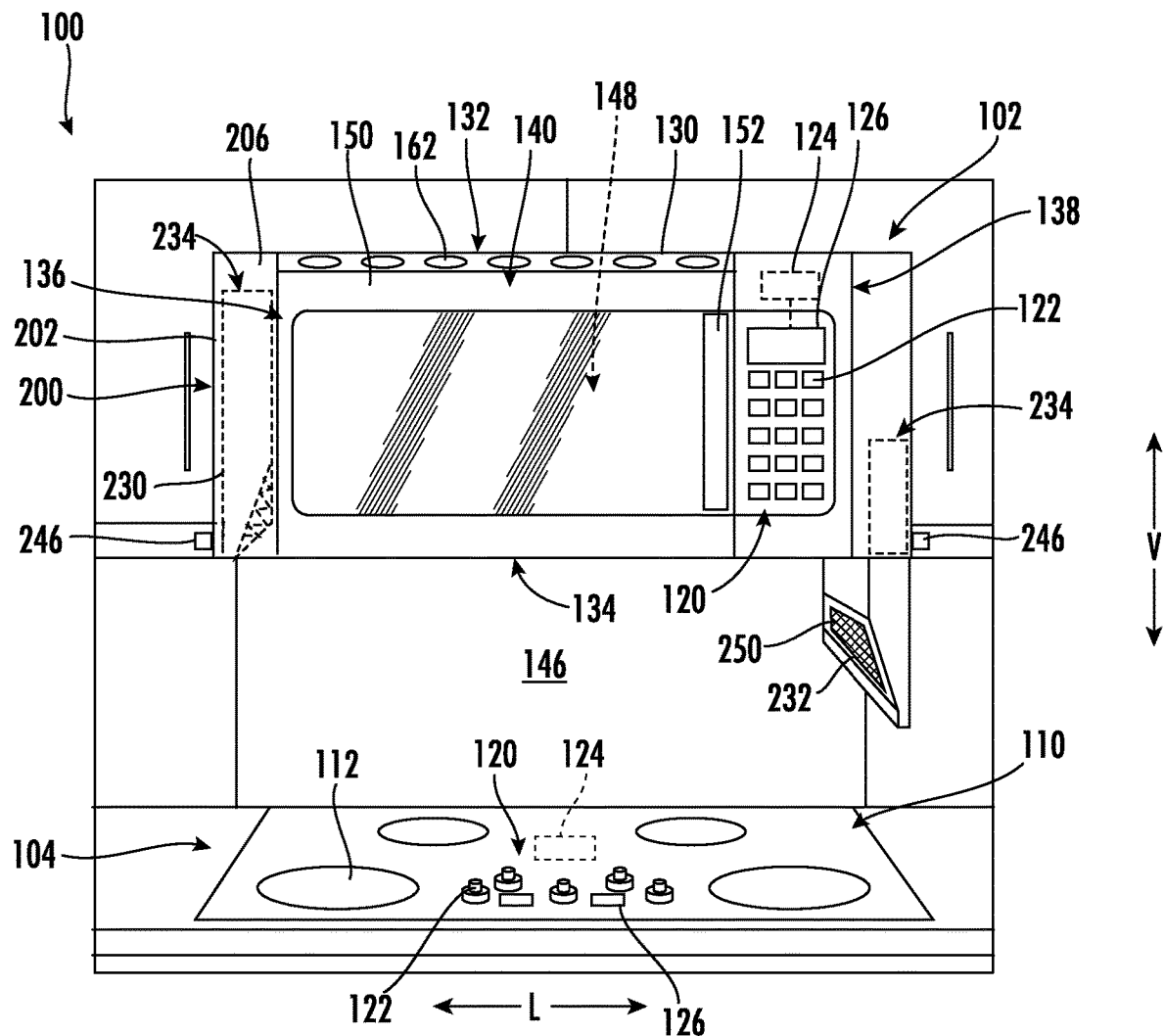
FIG. 1 provides a front view of a system, including an over the range microwave appliance, in accordance with an embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Embodiments of the present disclosure are referenced throughout this document with regard to an over the range (OTR) microwave with a ventilation system. The reference to a microwave is for illustration, not limitation. Any OTC appliance, for example a kitchen appliance, may be paired with a ventilation system to yield an over the range kitchen appliance in accordance with this disclosure. For example, a radiant heat oven, a combination cooking mode oven, or a communications or entertainment hub may be paired with a ventilation system without departing the scope of this disclosure.

Turning to the figures, FIG. 1 provides a front view of a system 100 according to exemplary embodiments of the present disclosure. System 100 generally includes an over-the-range (OTR) microwave appliance 102 that can be positioned or mounted above a cooktop appliance or cooktop 104. Each of these appliances 102, 104 within system 100 will be described independently and collectively below.

However, it should be appreciated that the present subject matter is not limited to the specific appliances disclosed, and the specific appliance configurations are not intended to limit the scope of the present subject matter in any manner. For example, cooktop 104 may be part of an oven range appliance, the style and configuration of microwave appliance 102 may vary, etc. Thus, the example embodiments illustrated in the figures are not intended to limit the present subject matter to any particular cooking chamber or heating element configuration, except as otherwise indicated.

As shown in FIG. 1, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and cooktop 104 and will thus be used interchangeably to describe both appliances and their positions relative to each other.

Cooktop 104 can include a cooking surface 110 having one or more heating elements 112 (four shown) for use in, for example, heating or cooking operations. In exemplary embodiments, cooking surface 110 is constructed with ceramic glass. In other embodiments, however, cooking surface 110 may include another suitable material, such as a metallic material (e.g., steel) or another suitable non-metallic material. Heating elements 112 may be various sizes and may employ any suitable method for heating or cooking an object, such as a cooking utensil (not shown), and its contents. In some embodiments, for example, heating element 112 uses a heat transfer method, such as electric coils or gas burners, to heat the cooking utensil. In other embodiments, however, heating element 112 uses an induction heating method to heat the cooking utensil directly. In turn, heating element 112 may include a gas burner element, resistive heat element, radiant heat element, induction element, or another suitable heating element.

As illustrated, microwave appliance 102 and cooktop 104 may each include a user interface panel 120 that may generally be used to regulate operation of each appliance. Due to the similarity between appliances, like reference numerals may be used to refer to the same or similar features. In some embodiments, user interface panel 120 includes input components or controls 122, such as one or more of a variety of electrical, mechanical, or electro-mechanical input devices. Controls 122 may include, for example, rotary dials, knobs, push buttons, and touch pads. A controller 124 is in communication with user interface panel 120 and controls 122 through which a user may select various operational features and modes and monitor progress of cooktop 104. In additional or alternative embodiments, user interface panel 120 includes a display component 126, such as a digital or analog display in communication with a controller 124 and configured to provide operational feedback to a user. In certain embodiments, user interface panel 120 represents a general purpose I/O ("GPIO") device or functional block.

As shown, controller 124 is communicatively coupled (i.e., in operative communication) with user interface panel 120, controls 122, and display 126. Controller 124 may also be communicatively coupled with various operational components of cooktop 104 as well, such as heating elements (e.g., 112), sensors, etc. Input/output ("I/O") signals may be routed between controller 124 and the various operational components of cooktop 104. Thus, controller 124 can selectively activate and operate these various components. Various components of cooktop 104 are communicatively coupled with controller 124 via one or more communication lines such as, for example, conductive signal lines, shared communication busses, or wireless communications bands.

In some embodiments, controller 124 includes one or more memory devices and one or more processors. The processors can be any combination of general or special purpose processors, CPUs, or the like that can execute programming instructions or control code associated with operation of cooktop 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 124 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 124 includes a network interface such that controller 124 can connect to and communicate over one or more networks with one or more network nodes. Controller 124 may also include one or more transmitting, receiving, or transceiving components for transmitting/receiving communications with other devices communicatively coupled with cooktop 104. Additionally, or alternatively, one or more transmitting, receiving, or transceiving components can be located off board controller 124. Generally, controller 124 can be positioned in any suitable location throughout cooktop 104. For example, controller 124 may be located proximate to user interface panel 120 toward front portion of cooktop 104. In optional embodiments, controller 124 of cooktop 104 may be in operable communication with controller 124 of microwave appliance 102 (e.g., through one or more wired or wireless channels).

As noted above, microwave appliance 102 may be positioned or mounted above cooktop 104 (e.g., as an OTR microwave). Specifically, microwave appliance may include a cabinet 130 that is positioned above cooktop 104 along the vertical direction V. In embodiments, cabinet 130 may be an insulated cabinet and may include a plurality of outer walls. For example, when assembled, microwave appliance 102 may extend along the vertical direction V between a top end 132 and a bottom end 134; along the lateral direction L between a first sidewall 136 (left side as shown from the front view of FIG. 1) and a second sidewall 138 (right side as shown from the front view of FIG. 1); and along the transverse direction T between a front end 140 and a rear end 142.

In some embodiments, cabinet 130 is spaced apart from cooking surface 110 along the vertical direction V. In this regard, an open region 146 may thus be defined along the vertical direction V between cooking surface 110 and bottom end 134 of cabinet 130. Although a generally rectangular shape is illustrated, any suitable shape or style may be adapted to form the structure of cabinet 130. Within cabinet 130, an internal liner of cabinet 130 defines a cooking chamber 148 for receipt of food items for cooking.

Microwave appliance 102 includes a door assembly 150 that is movably mounted (e.g., rotatably attached) to cabinet 130 in order to permit selective access to cooking chamber 148. Specifically, door assembly 150 can move between an open position (not pictured) and a closed position (e.g., FIG. 1). The open position permits access to cooking chamber 148 while the closed position restricts access to cooking chamber 148. The handle 152 may be mounted to or formed on door assembly 150 to assist a user with opening and closing door assembly 150.

Microwave appliance 102 is generally configured to heat articles (e.g., food or beverages) within cooking chamber 148 using electromagnetic radiation. Microwave appliance 102 may include various components which operate to produce the electromagnetic radiation, as is generally understood. For example, microwave appliance 102 may include a heating assembly 154 in a mechanical compartment 156 (FIG. 2) above cooking chamber 148, the heating assembly 154 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 148.

The structure and intended function of microwave ovens are generally understood by those of ordinary skill in the art and are not described in further detail herein. According to alternative embodiments, microwave oven may include one or more heating elements, such as electric resistance heating elements, gas burners, other microwave heating elements, halogen heating elements, or suitable combinations thereof, are positioned within cooking chamber 104 for heating cooking chamber 104 and food items positioned therein.

As described above, mechanical compartment 156 includes the heating assembly 154 for microwave appliance 102. As generally known, certain components in a microwave heating assembly, for example the magnetron, generate excessive heat during operation. According to the present disclosure removal of the excessive heat may be achieved, for example, by providing a cooling air flow path 160 through cabinet 130. Cooling air flow path 160 may include cooling air inlets 162 defined by a portion of the cabinet 130, for example, at front end 140. A fan 164 may be fluidly coupled to cooling air flow path 160 to draw air in through the air inlets 162 and through the mechanical compartment 156 of cabinet 130 and then to an exhaust, for example exhaust vent 166. In this manner, fan 164 may selectively draw a flow of exhaust air 168 through cooling air flow path 160, e.g., to cool heating assembly 154 and evacuate smoke and steam generated at cooktop 104.

Notably, microwave courses are commonly installed within openings in cabinetry that are larger than a width of the microwave. For example, common microwaves have a width of 30 inches and are installed in 36 inch openings within cabinetry. In this manner, the cabinetry opening size is as wide as common cooktops, e.g., such as 36 inch cooktops. In order to fill the gaps between the sides of the microwave appliance 100 and the adjacent cabinetry, cover plates may be mounted adjacent each side of the microwave and may extend from the sidewall the microwave to the adjacent cabinetry to provide a cleaner look. However, these spacers provide only aesthetic value and no functional improvement in the operation of the microwave. Accordingly, aspects of the present subject matter are generally directed to modular duct assemblies that may be attached to the side of a microwave cabinet for maximizing the functional potential of this otherwise wasted space.

Specifically, referring now generally to FIGS. 1 through 8, modular duct assemblies 200 will be described according to example embodiments of the present subject matter. Although duct assemblies 200 are described as being used with microwave appliance 100 and being removably attachable to cabinet 130, it should be appreciated that duct assemblies 200 may be utilized with any other suitable microwave appliance. In addition, a single duct assembly 200 and its manner for use with cabinet 130 will be described. However as illustrated in the drawings and would be appreciated by one of ordinary skill in the art, multiple duct assemblies 200 may be utilized with microwave appliance 100, e.g., positioned on each lateral side of cabinet 130.

In general, duct assembly 200 includes a fixed outer duct 202 that is mounted to a sidewall of cabinet 130, e.g., such as first sidewall 136 and/or second sidewall 138. It should be appreciated that fixed outer duct 202 may be attached to cabinet 130 in any suitable manner. For example, fixed outer duct may include one or more attachment flanges 204 that extend outwardly and are configured for receiving one or more mechanical fasteners to join fixed outer duct 202 to first sidewall 136. In order to conceal such fasteners for improved appearance, duct assemblies 200 may further include one or more appearance panels 206 that may be positioned over attachment flanges 204 and/or mechanical fasteners. According to still other embodiments, cabinet 130 and fixed outer duct 202 may have a tongue and groove engagement, may be attached using one or more adhesives, etc.

According to the illustrated embodiment, fixed outer duct 202 includes an outer panel 210 that is spaced apart from cabinet 130 along the lateral direction L. In this regard, outer panel 210 spaced apart from first sidewall 136. In addition, fixed outer duct 202 may include a top panel 212, a front panel 214, and a rear panel 216, the front panel 214 and rear panel 216 being spaced apart along the transverse direction T. In general, panels 210-216 along with first sidewall 136 combine to at least partially define a duct or flow path through which exhaust air 168 may be drawn into appliance.

Figure 2:
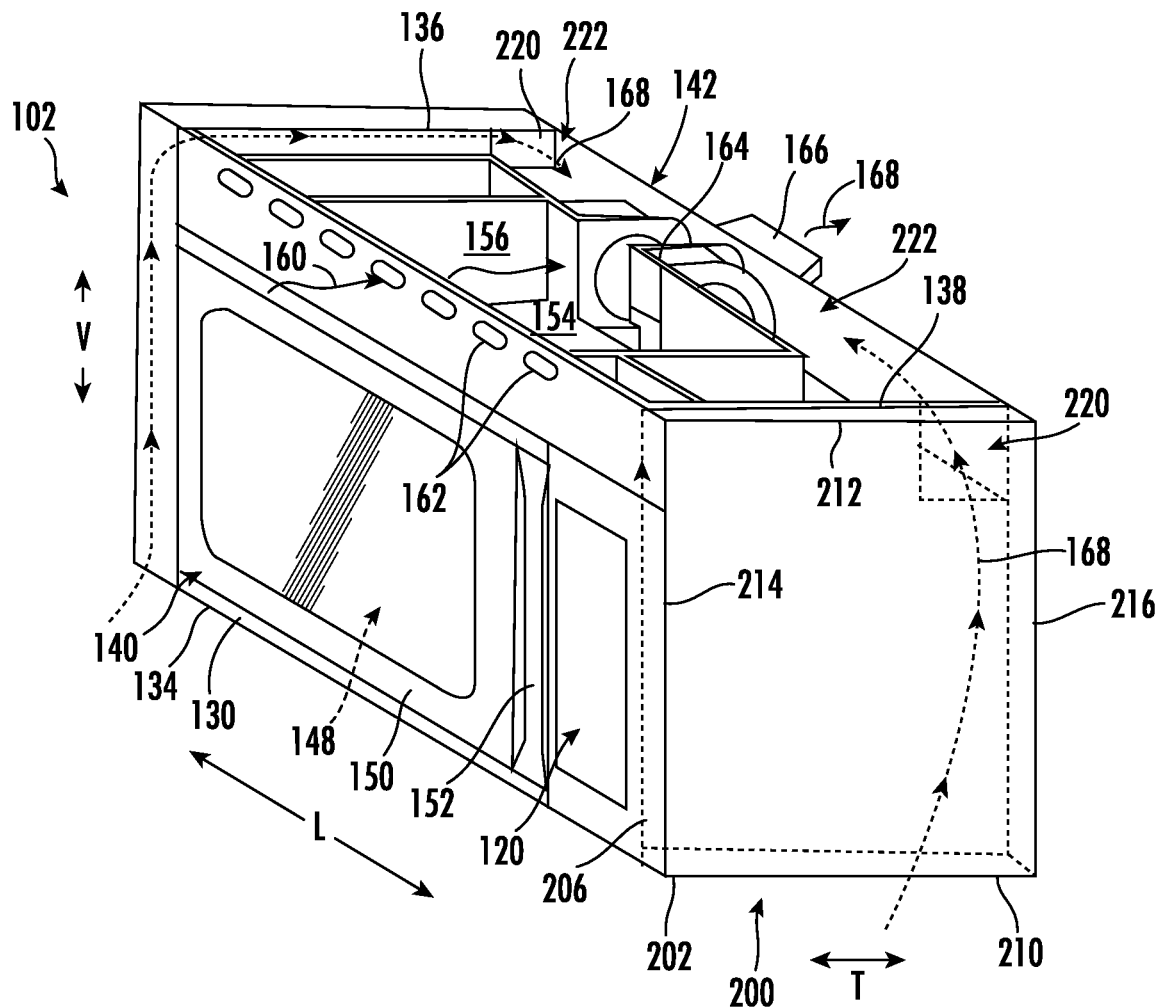
FIG. 2 is a perspective view of an over the range microwave appliance and modular duct assemblies according to an example embodiment of the present subject matter with a top panel removed for clarity.
Figure 3:
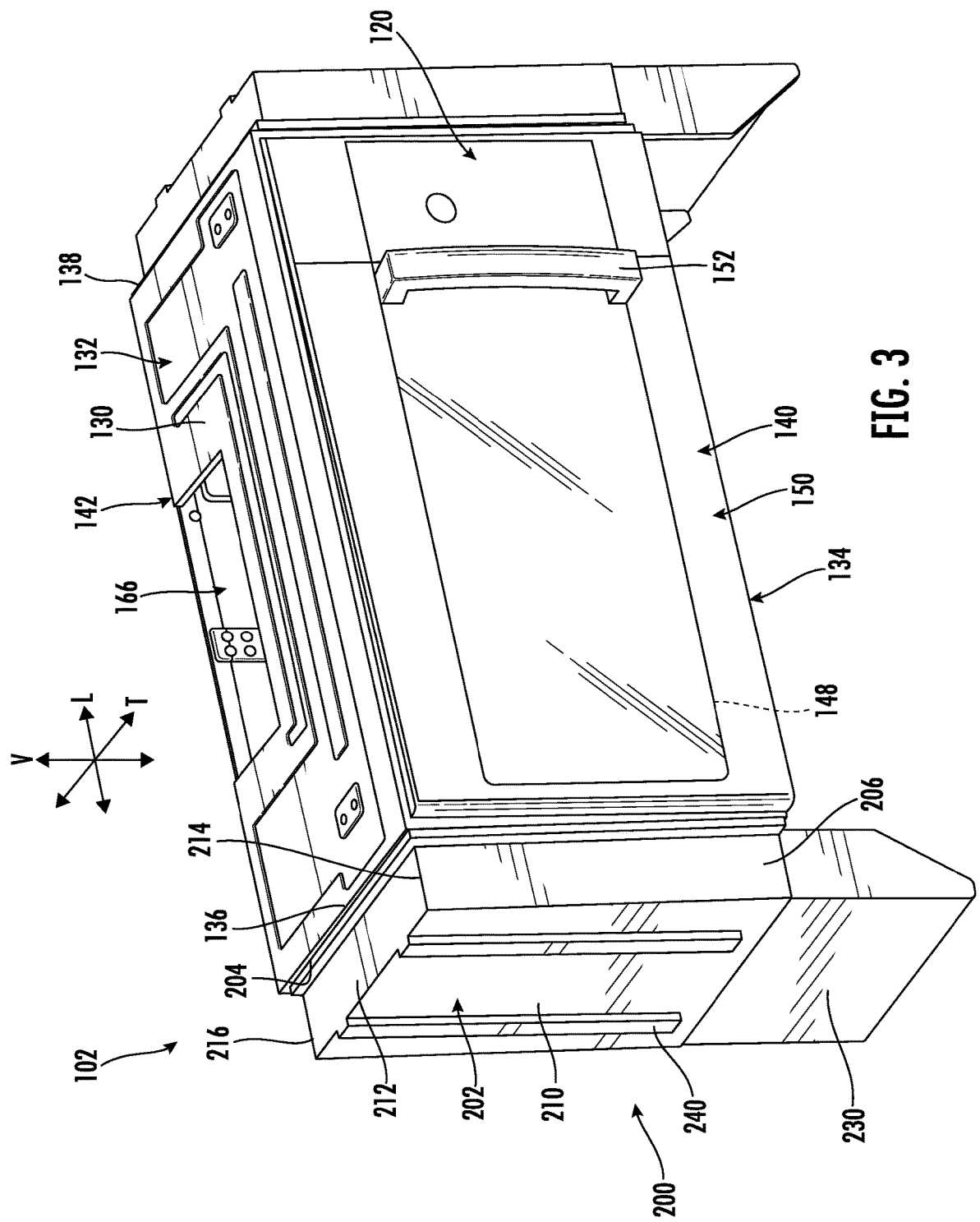
FIG. 3 is a perspective view of the example over the range microwave appliance of FIG. 2.
Figure 4:
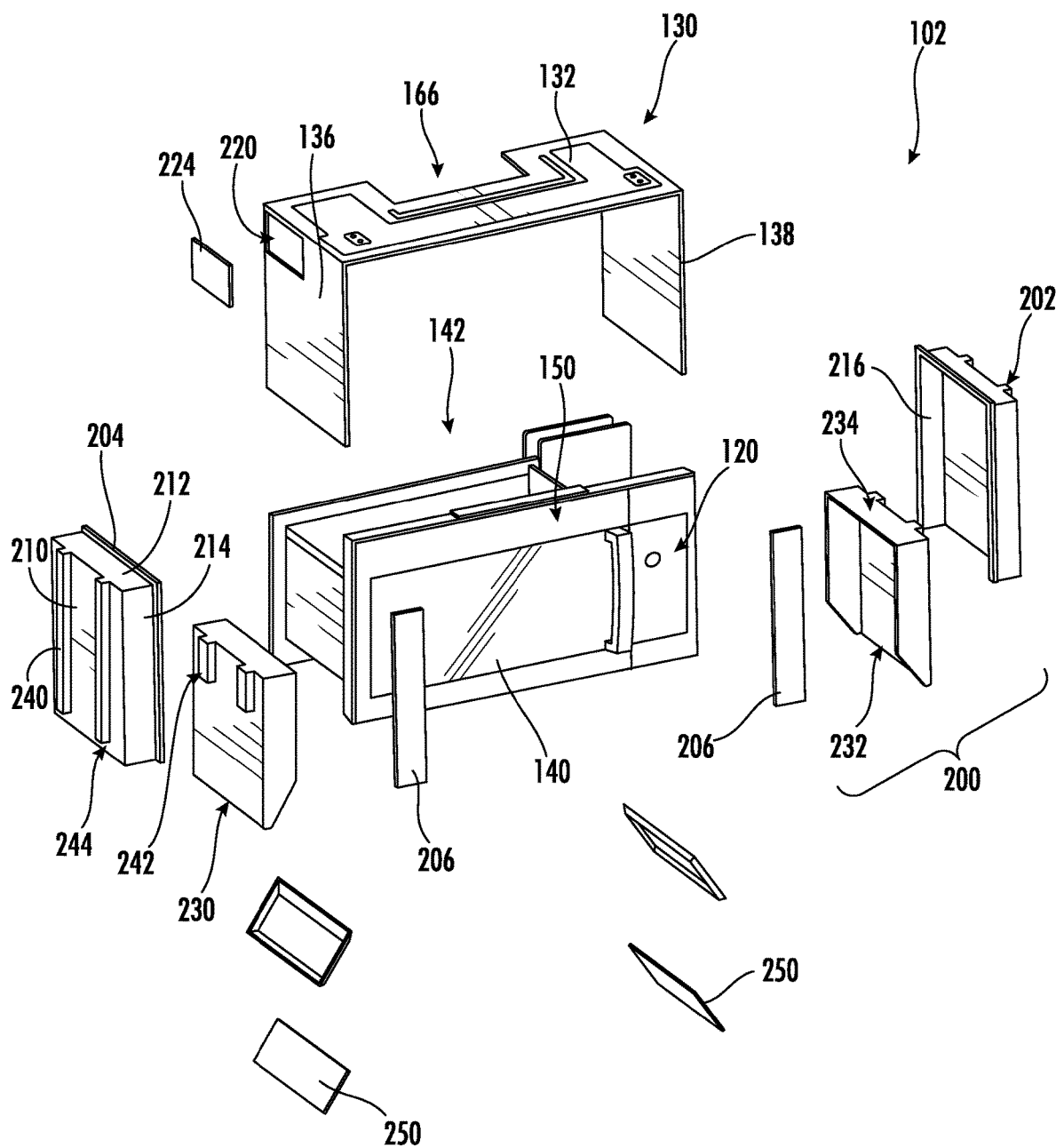
FIG. 4 is an exploded perspective view of the example over the range microwave appliance of FIG. 2.

In addition, as shown in FIGS. 2 and 4, cabinet 130 may define one or more fan inlets 220 which are fluidly coupled to lateral ducts 222 for drawing in air through duct assemblies 200. According to the illustrated embodiment, fan inlets 220 may be defined on each side of cabinet 130, e.g., within first sidewall 136 and second sidewall 138. When duct assemblies 200 are not in use or a user has not installed duct assemblies 200, microwave appliance 100 may include blocking plates 224 that are attachable over fan inlets 220 to shut off lateral ducts 222. According to the illustrated embodiment, lateral ducts 222 may fluidly couple fan inlets 220 to fan 164 and exhaust vent 166. In this manner, operation of fan 164 may draw air through duct assemblies 200 and discharge the air out exhaust vent 166.

Referring again generally to FIGS. 1 through 8, duct assemblies 200 may further include an extendable duct 230 that is positioned within fixed outer duct 202 and is movable between an extended position (e.g., as shown in FIG. 6) and a retracted position (e.g., as shown in FIG. 5). In general, extendable duct 230 defines an intake aperture 232 proximate a bottom and of extendable duct 230 and a discharge aperture 234 proximate a top end of extendable duct 230. According to the illustrated embodiment, extendable duct 230 may be contained entirely within fixed outer duct 202 when in the retracted position. By contrast, in the extended position, intake aperture 232 may be positioned at a fixed distance below bottom 134 of cabinet 130. For example, extendable duct 230 may extend between 1 inch and 20 inches, between 2 and 15 inches, between 3 and 10 inches, or between about 4 and 5 inches below the bottom 134 of cabinet 130 in the extended position. Notably, in both the extended and the retracted position, discharge aperture 234 may remain within fixed outer duct 202 to maintain a complete exhaust flow path from intake aperture 232 all the way through to exhaust vent 166.

Figure 5:
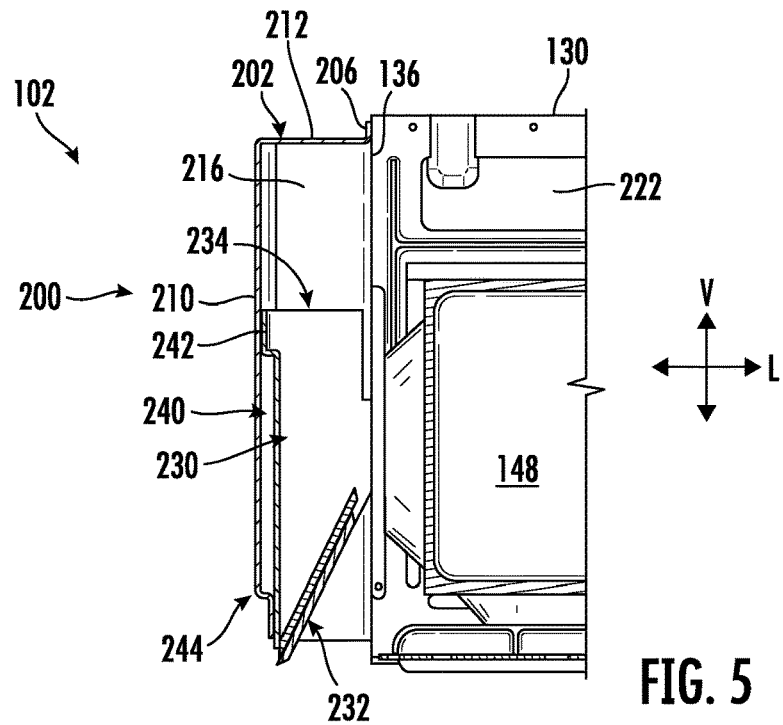
FIG. 5 is a cross sectional view of one of the example duct assemblies of FIG. 2 in a retracted position according to an example embodiment of the present subject matter.
Figure 6:
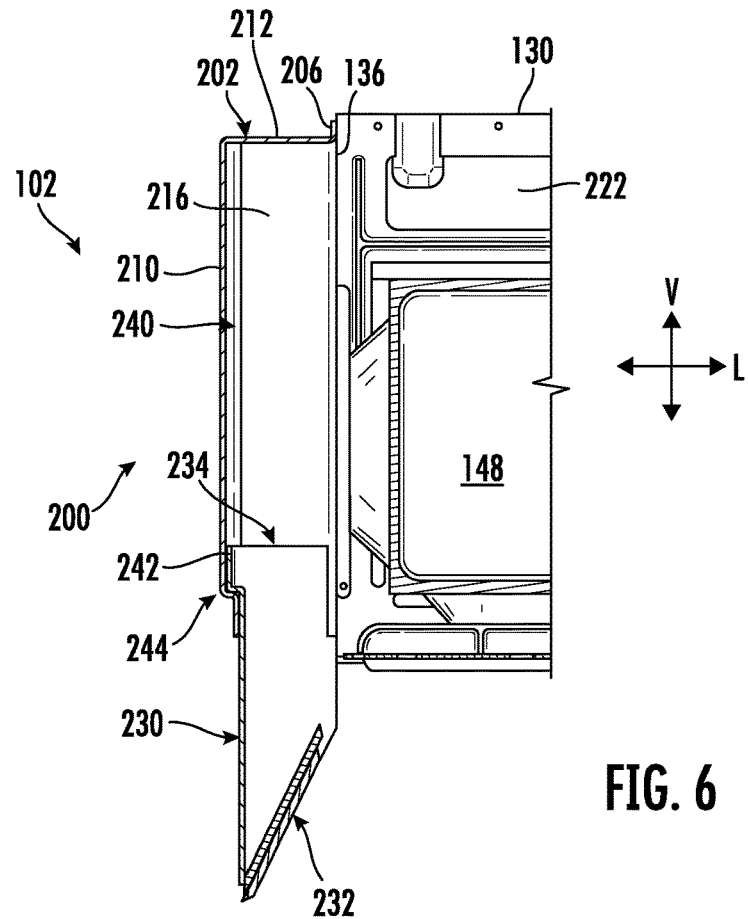
FIG. 6 is a cross sectional view of one of the example duct assemblies of FIG. 2 in an extended position according to an example embodiment of the present subject matter.

According to exemplary embodiments, extendable duct 230 is movable along a series of tracks defined within fixed outer duct 202. In this regard, as best shown in FIGS. 5 and 6, fixed outer duct may define a plurality of vertical tracks 240 and extendable duct 230 may define one or more complementary protrusions 242 that are slidably received within vertical tracks 240. In this manner, extendable duct 230 may slide up and down along the vertical direction V within the fixed outer duct 202. In addition, fixed outer duct 202 may define a mechanical stop 244 proximate a bottom end of fixed outer duct 202. Accordingly, mechanical stop 244 may be configured for engaging complementary protrusions 242 of extendable duct 230 in the extended position, e.g., to prevent removal of extendable duct 230 from duct assembly 200.

The extendable ducts 230 on either side of microwave appliance 100 may be independent of each other, so one may be extended when the other retracted, both may be retracted, or both may be extended. To facilitate maintaining a side duct in a desired vertical displacement, a latch 246 (e.g., illustrated schematically in FIG. 1) may be provided to secure the extendable ducts 230 in a selected vertical position. The latch 246 may be a mechanical latch that engages a portion of the extendable duct 230 and fixes it against unintended vertical displacement. For example, a spring-loaded push button may cooperate with one of more vertically aligned holes to selectively position an extendable duct 230 within fixed outer duct 202. In other embodiments, positioning rails, for example a rack and pinion arrangement, may be used to selectively position extendable ducts 230. Other latching mechanisms may be used, for example friction or magnetic elements, to selectively position the extendable ducts 230.

According to still other embodiments, it should be appreciated that duct assemblies 200 may include any other suitable drive mechanism that is operably coupled to extendable ducts 230 for moving extendable duct 230 between the extended and the retracted position. For example, the drive mechanism may include an electric motor, and actuating piston, or any other suitable mechanical device. In addition, it should be appreciated that duct assemblies 200 may include one or more sensors (e.g., such as optical sensors or Hall-effect sensors) to detect the position of extendable ducts 230. According to an example embodiment, installation of duct assembly 200 may include operably coupling the drive mechanism and position sensors to controller 124 of microwave appliance 100, which may then operate duct assemblies 200 as needed depending on the cooking operation. In addition, microwave assembly 100 may further include sensors to detect dishes and the location of the dishes may be used to make intelligent decisions on how to manipulate and position extendable ducts 230, e.g., via automated movement by controller 124.

Figure 8:
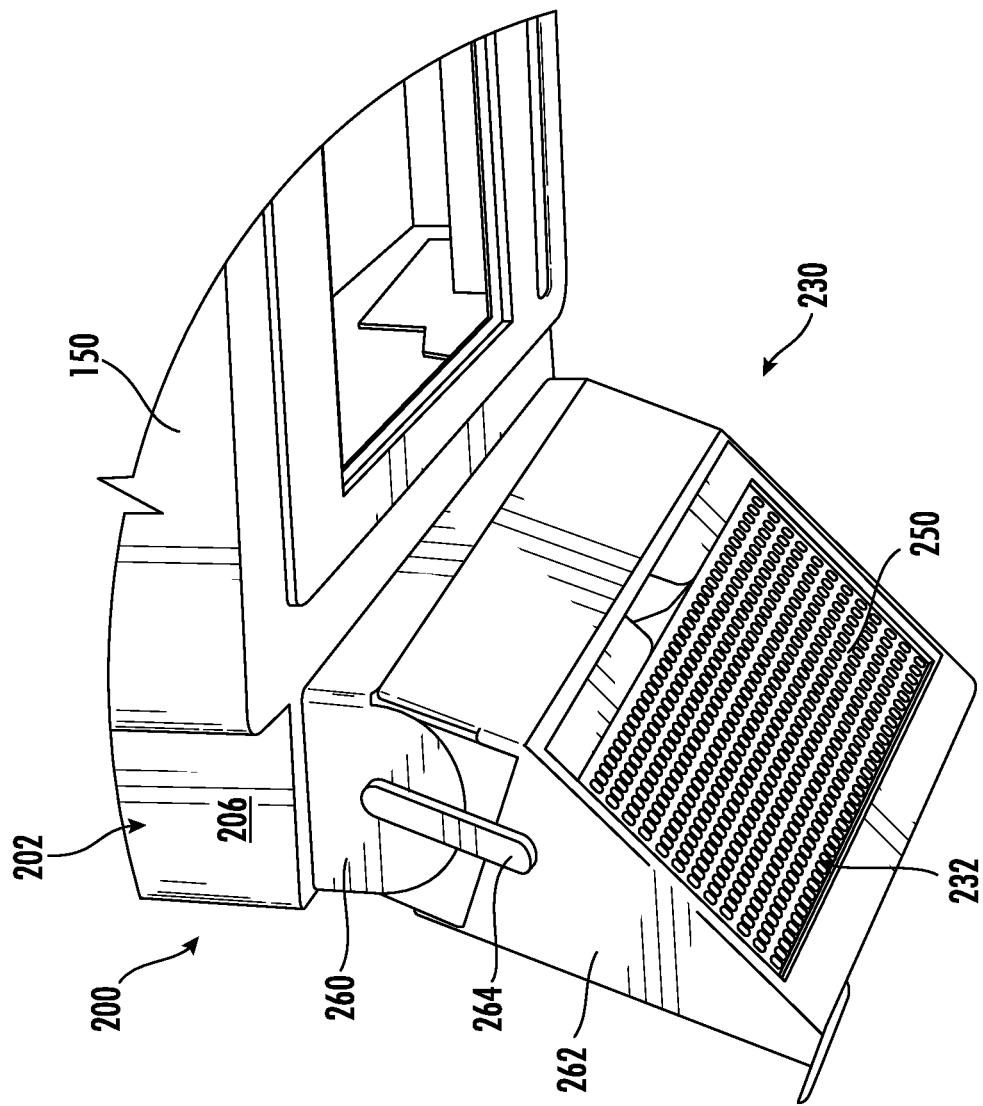
FIG. 8 is a bottom perspective view of one of the example duct assemblies of FIG. 7 in an extended position according to an example embodiment of the present subject matter.

As shown in FIG. 8, duct assembly 200 may further include one or more filter elements 250 to trap smoke, odors, or airborne grease given off at the cooking surface 110 of the cooktop 104. Filter elements 250 may be any material or construction suitable to withstand cooking temperatures and trap odors or particulates drawn into the duct assemblies 200. For example, filter elements 250 may be metallic mesh or woven fiberglass filters and may include activated charcoal to absorb or neutralize cooking odors.

As illustrated in the exemplary embodiment of FIGS. 5 and 6, intake aperture 232 of extendable ducts 230 may be configured such that it forms an acute angle with the vertical direction V. In this configuration, the intake aperture 232 is directed toward the central area of the cooking surface 110 and may contain steam, smoke, and odors emanating from the cooking surface 110. In other embodiments, the intake aperture 232 is perpendicular to the vertical direction V, i.e., generally parallel to the cooking surface 110, or perpendicular to the cooking surface 110.

Figure 7:
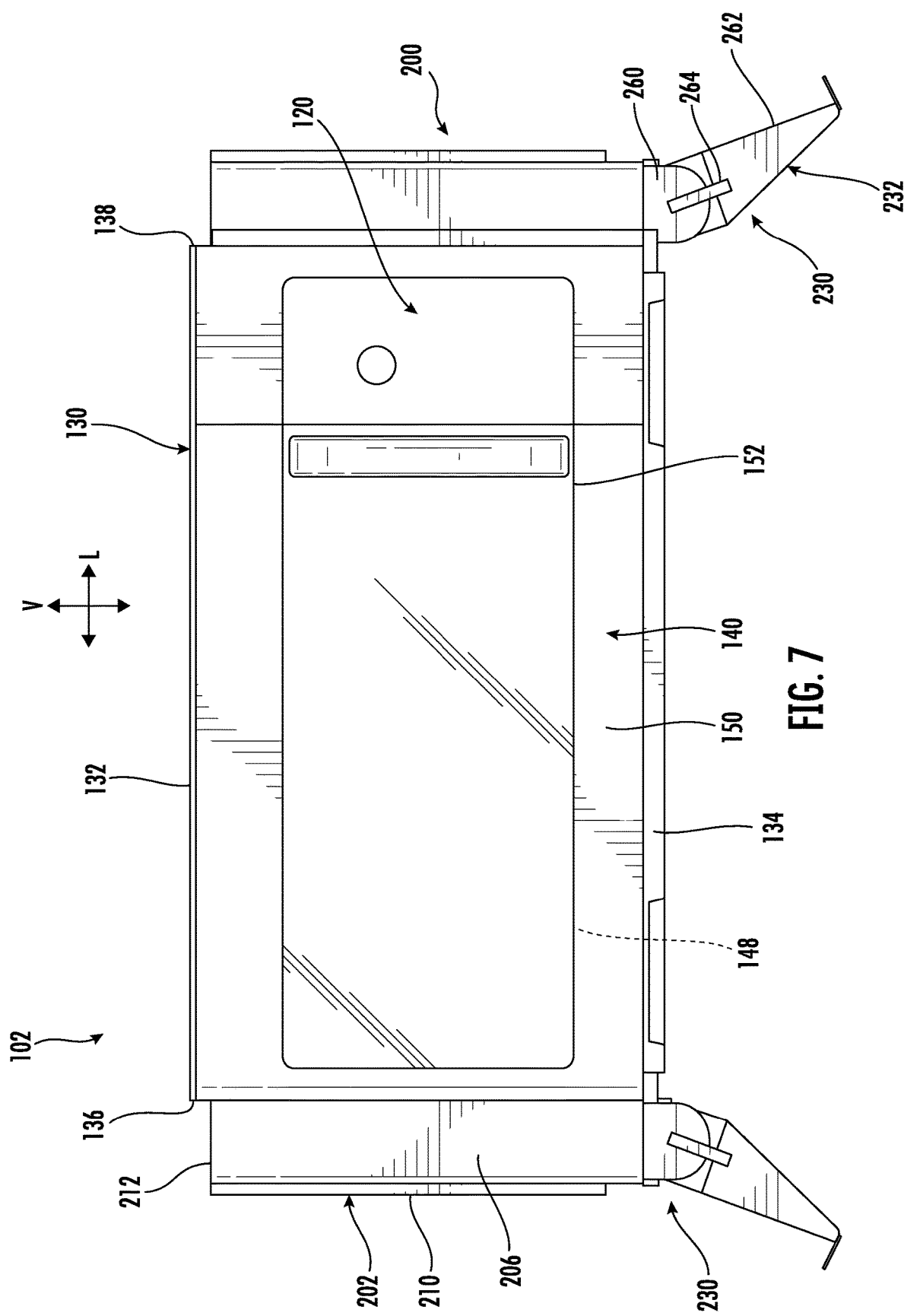
FIG. 7 is a front view of an over the range microwave appliance and modular duct assemblies according to an example embodiment of the present subject matter.

Referring now specifically to FIGS. 7 and 8, extendable ducts 230 may further include a pivoting mechanism to expand the footprint of duct assemblies 230 and increase the airflow intake for improved exhaust operation. In this regard, as illustrated, each extendable duct 230 may include a primary duct 260 that is generally slidable along the vertical direction V (e.g., as described above). In addition, a pivoting duct 262 may be attached to primary duct 260 and may be pivotable between a vertical orientation (e.g., similar to that illustrated in FIGS. 1 through 6) and an angled orientation (e.g., as shown in FIGS. 7 and 8). Similar to the extension process, the pivoting of pivoting duct 260 may be automated with a drive mechanism or may be manually manipulated by a user of microwave appliance 100.

In general, pivoting duct 262 may be mounted to primary duct 260 using any suitable mechanism. However, according to illustrated embodiment, pivoting duct 262 is attached to primary duct 260 by one or more pivot pins 264. In addition, it should be appreciated that the pivot angle of pivoting duct 262 may vary while remaining within the scope of the present subject matter. For example, the pivot angle may be between about 5° and 90°, between about 10° and 60°, between about 15° and 45°, between about 20° and 40°, or about 30° relative to the vertical direction V. Other suitable pivot angles and configurations are possible and within the scope of the present subject matter.

As explained herein, aspects of the present subject matter are generally directed to a modular drop-down vent for an over-the-range ("OTR") microwave oven, e.g., such as a 36" OTR microwave. For example, the drop-down vent may be 3 inches in width and may be attached to a 30" OTR microwave after installation to fit 36" space. In addition, the design may include a flexible duct that moves near to a cooking utensil on a cooktop positioned below for capturing the steam, smoke, and/or older. The drop-down vent may include a proximity sensor that senses dishes and drops down the vent closer to the dish using a motor to improve capture efficiency. In addition, the flexible duct system with pivot allows for pivoting the duct closer to the dishes to capture steam, smoke, and odor. The present subject matter requires only limited modification to the outer case of a 30" OTR microwave and does not require any modification to the base plate. It keeps the 30" OTR microwave with a modified outer case for detachable inlet cover, and can be sold as an aftermarket kit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An over the range microwave appliance defining a vertical direction, a lateral direction, and a transverse direction, the over the range microwave appliance comprising:
    a cabinet defining a cooking chamber, the cabinet comprising a sidewall that defines a first fan inlet and a second fan inlet; and
    a first duct assembly and a second duct assembly each being removably attached to the cabinet and being extendable independently of each other, each of the first duct assembly and the second duct assembly comprising:
        a fixed outer duct that is mounted to the sidewall of the cabinet; and
        an extendable duct positioned within the fixed outer duct and being movable between an extended position and a retracted position, the extendable duct defining an intake aperture proximate a bottom end of the extendable duct and a discharge aperture proximate a top end of the extendable duct.

2. The over the range microwave appliance of claim 1, wherein the fixed outer duct comprises an outer panel spaced apart from the cabinet along the lateral direction, a top panel, and a front panel and a rear panel spaced apart along the transverse direction.

3. The over the range microwave appliance of claim 1, wherein the discharge aperture is positioned within the fixed outer duct in both the extended position and the retracted position.

4. The over the range microwave appliance of claim 1, wherein the extendable duct is contained entirely within the fixed outer duct in the retracted position.

5. The over the range microwave appliance of claim 1, wherein the fixed outer duct defines a plurality of vertical tracks and the extendable duct defines a complementary protrusion that slides within the vertical tracks.

6. The over the range microwave appliance of claim 5, wherein the fixed outer duct defines a mechanical stop proximate a bottom of the fixed outer duct, the mechanical stop being configured for engaging the complementary protrusion of the extendable duct in the extended position.

7. The over the range microwave appliance of claim 1, wherein the extendable duct comprises:
    a primary duct that is slidable along the vertical direction; and
    a pivoting duct that is attached to the primary duct and is pivotable between a vertical orientation and an angled orientation.

8. The over the range microwave appliance of claim 7, wherein the pivoting duct is attached to the primary duct by one or more pins.

9. The over the range microwave appliance of claim 7, wherein the pivoting duct is pivotable to a pivot angle between 15 degrees and 45 degrees relative to the vertical direction.

10. The over the range microwave appliance of claim 1, wherein the intake aperture of the extendable duct is oriented at an angle relative to the vertical direction.

11. The over the range microwave appliance of claim 1, wherein the duct assembly further comprises:
    a filter element positioned within the intake aperture of the extendable duct.

12. The over the range microwave appliance of claim 1, further comprising:
    a fan positioned in the cabinet in fluid communication with the duct assembly.

13. The over the range microwave appliance of claim 1, further comprising:
   a drive mechanism operably coupled to the extendable duct for moving the extendable duct between the extended position and the retracted position.

14. The over the range microwave appliance of claim 1, further comprising:
   one or more sensors for detecting a position of one or more cooking utensils or items positioned on a cooktop positioned below the over the range microwave appliance.

15. The over the range microwave appliance of claim 1, further comprising:
   one or more blocking plates that are attachable over the fan inlet defined in the cabinet.

16. A duct assembly for an over the range microwave appliance, the over the range microwave appliance comprising a cabinet defining a cooking chamber, the cabinet comprising a sidewall that defines a fan inlet, the duct assembly comprising a first duct assembly and a second duct assembly each being removably attached to the cabinet and being extendable independently of each other, each of the first duct assembly and the second duct assembly comprising:
   a fixed outer duct that is removably mounted to the sidewall of the cabinet; and
   an extendable duct positioned within the fixed outer duct and being movable between an extended position and a retracted position, the extendable duct defining an intake aperture proximate a bottom end of the extendable duct and a discharge aperture proximate a top end of the extendable duct.

17. The duct assembly of claim 16, wherein the discharge aperture is positioned within the fixed outer duct in both the extended position and the retracted position.

18. The duct assembly of claim 16, wherein the fixed outer duct defines a plurality of vertical tracks and the extendable duct defines a complementary protrusion that slides within the vertical tracks, and wherein the fixed outer duct defines a mechanical stop proximate a bottom of the fixed outer duct, the mechanical stop being configured for engaging the complementary protrusion of the extendable duct in the extended position.

19. The duct assembly of claim 16, wherein the extendable duct comprises:
   a primary duct that is slidable along a vertical direction; and
   a pivoting duct that is attached to the primary duct and is pivotable between a vertical orientation and an angled orientation.

20. The over the range microwave appliance of claim 1, further comprising:
   a mechanical latch that engages a portion of the extendible duct to fix it from unintended vertical displacement.

* * * * *